United States Patent [19]

Wielang et al.

[11] 4,017,253

[45] Apr. 12, 1977

[54] FLUIDIZED-BED CALCINER WITH COMBUSTION NOZZLE AND SHROUD

[75] Inventors: Joseph A. Wielang, Idaho Falls; William B. Palmer, Shelley; William B. Kerr, Idaho Falls, all of Idaho

[73] Assignee: The United States of America as represented by the United States Energy Research and Development Administration, Washington, D.C.

[22] Filed: Sept. 16, 1975

[21] Appl. No.: 613,779

[52] U.S. Cl. .................................. 432/58; 431/10; 431/170; 431/351; 239/419.3; 23/288 S; 110/8 F

[51] Int. Cl.² ..................... F27B 15/14; F23M 3/04

[58] Field of Search ......... 432/15, 58; 34/10, 57 A, 34/57 R; 110/8 F, 28 J; 23/288 S, 277 R; 431/7, 170, 10, 353, 354, 187, 188, 351; 239/419.3, 434, 424, 434.5, 428, 426, 424.5

[56] References Cited

UNITED STATES PATENTS

| 1,308,739 | 7/1919 | Richardson et al. | 431/7 |
|---|---|---|---|
| 2,582,710 | 1/1952 | Martin | 432/58 |
| 2,786,742 | 3/1957 | McKinley et al. | 239/434.5 |
| 3,368,804 | 2/1968 | Swain | 110/8 F |
| 3,370,918 | 2/1968 | Begley | 23/284 |
| 3,638,865 | 2/1972 | McEneny et al. | 230/424 |
| 3,790,086 | 2/1974 | Masai | 239/426 |

FOREIGN PATENTS OR APPLICATIONS

| 2,070,543 | 4/1971 | France | 432/58 |
|---|---|---|---|
| 890,986 | 3/1962 | United Kingdom | 110/28 J |

Primary Examiner—John J. Camby
Assistant Examiner—Henry C. Yuen
Attorney, Agent, or Firm—Dean E. Carlson; Arthur A. Churm; Hugh W. Glenn

[57] ABSTRACT

A nozzle employed as a burner within a fluidized bed is coaxially enclosed within a tubular shroud that extends beyond the nozzle length into the fluidized bed. The open-ended shroud portion beyond the nozzle end provides an antechamber for mixture and combustion of atomized fuel with an oxygen-containing gas. The arrangement provides improved combustion efficiency and excludes bed particles from the high-velocity, high-temperature portions of the flame to reduce particle attrition.

4 Claims, 2 Drawing Figures

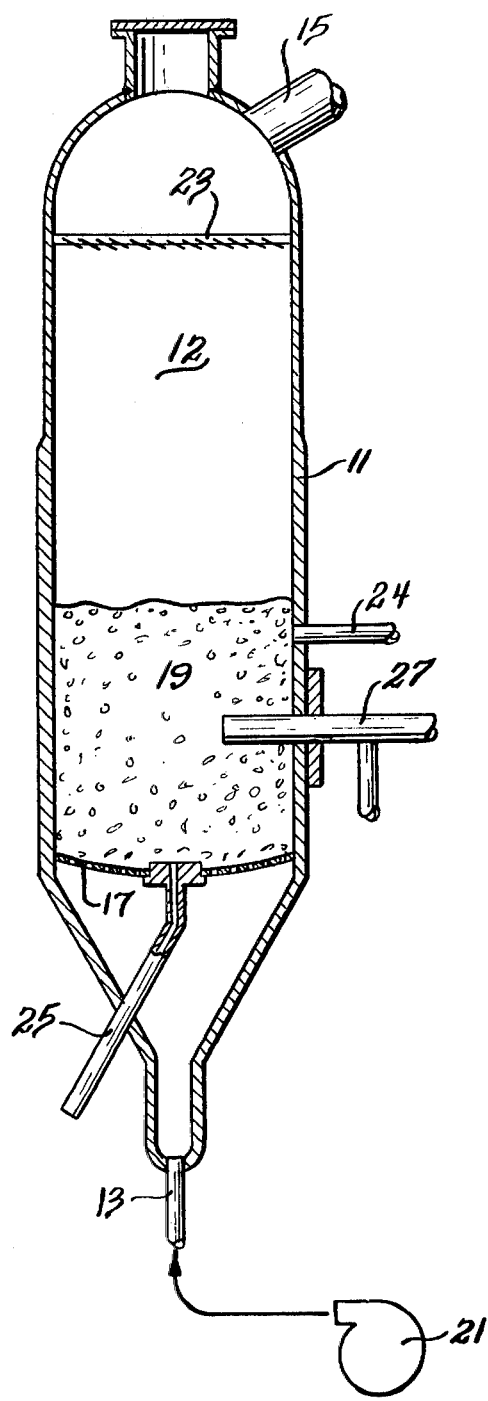
Fig—1

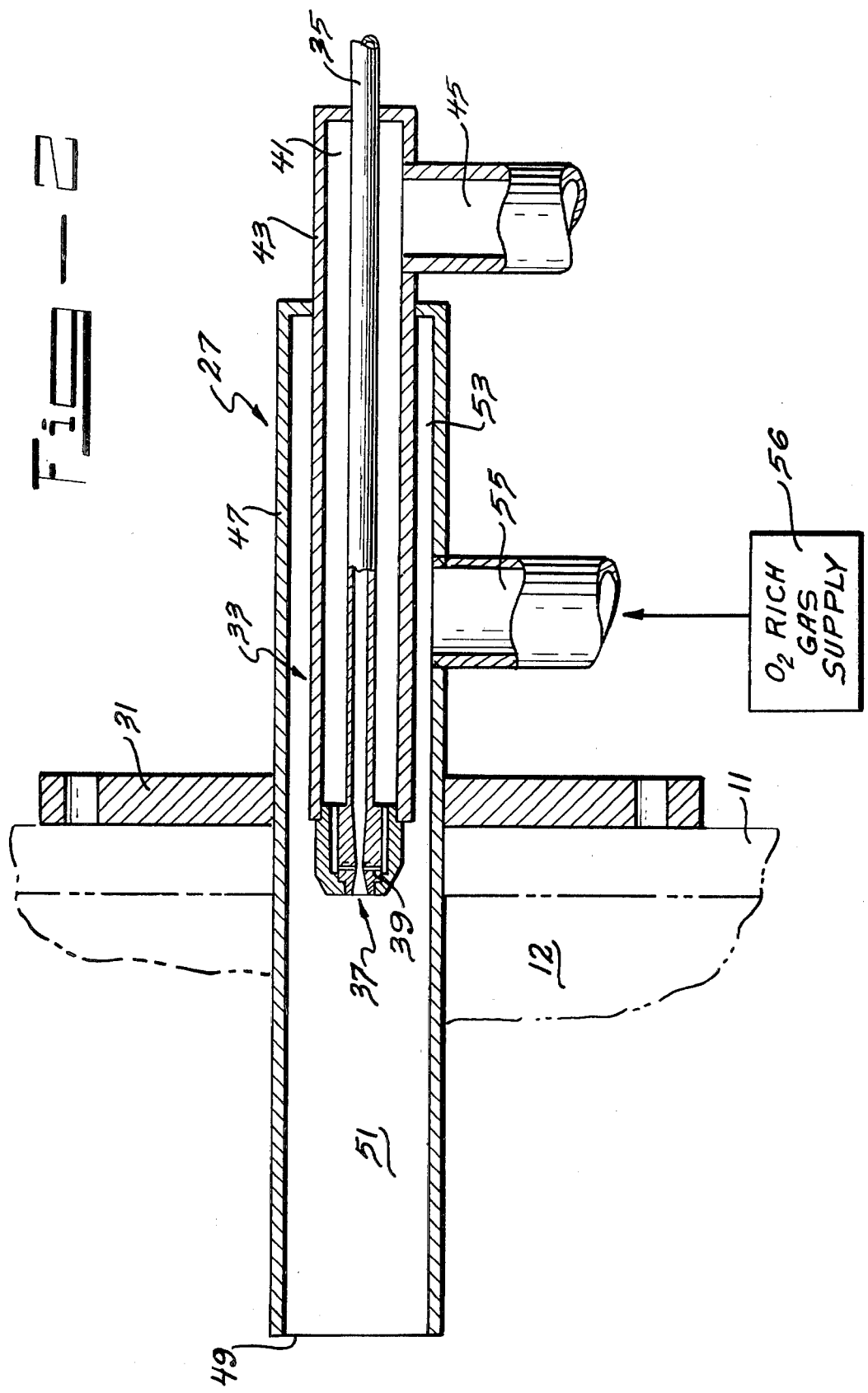

FLUIDIZED-BED CALCINER WITH COMBUSTION NOZZLE AND SHROUD

CONTRACTUAL ORIGIN OF THE INVENTION

The invention described herein was made in the course of, or under, a contract with the U.S. Energy Research and Development Administration.

BACKGROUND OF THE INVENTION

The present invention relates to an improvement in fluidized-bed calciners for the processing of liquids containing dissolved or entrained solids to form dry solid particles. It has application in the dehydration and denitration of radioactive waste material, both in slurry and in solution. The development also can be used in other solidification, dehydration and calcination processes such as in the processing of fertilizers and industrial chemicals.

Previous fluidized-bed calciners employing in-bed combustion of fuel have discharged mixtures of fuel with oxygen or air directly into the fluidized bed for combustion. The immediate dissemination of the fuel mixture throughout the fluidized bed can produce poor combustion efficiency. Also, the combustion gases discharged from the burner at high velocities and temperatures can cause attrition of bed particles with the production of fines. In radioactive waste processes where no contaminants can be released, the fine particles are particularly undesirable. The hot combustion gases can melt or soften bed particles, resulting in the formation of agglomerates or clinkers, particularly around the burner. The burner nozzles also can sustain severe erosion by exposure to the fluidized bed at the elevated temperatures.

The inventors, being aware of these problems in prior art in-bed combustion systems, have provided as their invention an improved fuel burner assembly for use within a fluidized-bed calciner.

It is an object of their invention to produce such an improved fuel burner assembly that will minimize attrition of fluidized-bed particles and production of fines.

It is a further object to increase combustion efficiency of fuel.

It is also an object to protect the fuel nozzle within the burner from erosion and clinker formation on and about its surfaces.

SUMMARY OF THE INVENTION

In accordance with the present invention, a fluidized-bed calciner for the solidification of solutions and slurries into dry particles includes a vessel with an internal chamber adapted to contain a fluidized bed of particulate material at high temperatures. The vessel is provided with one or more burner assemblies through the walls thereof for injecting a oxygen-containing gas and fuel into the internal chamber of the vessel. The burner assembly includes a nozzle for mixing oxygen-containing gas with fuel. The nozzle is positioned in a generally coaxial manner within an elongated, hollow shroud having an open end. The shroud extends beyond the end of the nozzle into the internal chamber of the vessel to form an antechamber within the shroud at its open end for the combustion of the fuel.

BRIEF DESCRIPTION OF THE DRAWINGS

The present invention is embodied in the accompanying drawings wherein:

FIG. 1 is a cross-sectional elevation view of a fluidized-bed calciner.

FIG. 2 is an enlarged cross-sectional view of a nozzle and shroud burner assembly that can be installed within the fluidized-bed calciner of FIG. 1.

DETAILED DESCRIPTION OF THE PREFERRED EMBODIMENT

In FIG. 1, a fluidized-bed calciner is shown. The calciner comprises a vessel 11 having an internal chamber 12, a fluidizing gas inlet 13 at the bottom and a fluidizing gas outlet 15 in the upper portion thereof. A perforated plate or grid 17 is supported within the lower portion of vessel 11 for distributing the upward gas flow throughout the bed of particulate solids illustrated at 19. A sufficient gas flow of, for instance, air is maintained through bed 19 by suitable means such as a compressor or blower 21 to fluidize the bed of particles. One or more baffles 23 may be affixed in the upper portion of the calciner vessel to reduce entrainment into gas outlet 15.

In the lower central portion of vessel 11, a feed inlet 24 is illustrated for introducing a liquid stream containing dissolved or entrained material that is to be solidified to form dry particles or powder. Both slurries and solution are contemplated for processing by evaporation of liquid, dehydration of combined moisture and calcination to form oxides where appropriate in each particular application.

A product outlet 25 for removing the dried particles is illustrated in the lower portion of vessel 11 as a conduit extending from the center of distribution plate 17 through the lower walls of the vessel 11 cone. Heat for evaporating the liquid and calcining the solid product is provided by one or more burner assemblies 27 shown penetrating the side walls of vessel 11 below the feed entry.

One important application for the fluidized-bed calciner is in the dehydration and denitration of waste solutions produced in the reprocessing of nuclear reactor fuels or other radioactive materials. Such waste solutions typically contain the nitric acid dissolution products of cladding, fission products and various materials adding in the reprocessing and conditioning of the solutions. The solutions may well contain strontium, barium, molybdenum, sodium, iron, aluminum and various other dissolved metallic nitrates. Examples of such solutions can be found in "Idaho Chemical Programs Annual Technical Report, Fiscal Year 1973", ICP-1047, Allied Chemical Corporation, Idaho Chemical Programs — Operations Office, 1974. The solutions are dehydrated and calcined within fluidized bed 19 to produce particulate and powdered metal oxide materials. These calcined materials can be continuously or intermittently withdrawn through the product outlet 25 during operation of the calciner.

Turning now to FIG. 2 where a burner assembly 27 is shown in more detail. The assembly is shown supported within a flange 31 that can be mounted on a suitable port provided through the walls of calciner vessel 11.

The fuel burner assembly 27 includes a nozzle unit 33 for intermixing a fuel with an oxygen-containing gas, for instance air, air enriched with oxygen or oxygen gas. Nozzle units of this type are well known, commercially available items and are not part of the present invention except in combination with the herein described improvements.

The nozzle unit 33 has a centrally disposed conduit 35 extending through its length. The conduit 35 terminates with a venturi section 37 having a central, constricted portion penetrated by a plurality of radially aligned passageways or orifices 39. An annulus 41 is provided around and along conduit 35 within a second conduit 43 extending along the length of conduit 35 and generally coaxially therewith. Conduit 43 is shown with a radially aligned inlet 45 for introducing either the flow of oxygen-containing gas or the liquid fuel through the annulus into orifices 39.

In operation, a liquid fuel such as a petroleum product or other hydrocarbon is atomized into fine droplets or spray within the flow of an oxygen-containing gas. The liquid fuel is preferably introduced through conduit 35 and the gas flow through annulus 41 and orifices 39 to atomize the fuel. However, satisfactory operation can be obtained with the reverse connections.

The nozzle unit 33 is contained within a hollow, elongated, shroud 47 that extends generally coaxially along and beyond the length of the nozzle unit 33. Shroud 47 extends beyond the end of nozzle unit 33 into the fluidized bed where it terminates with an open end 49. This extended portion of shroud 47 forms an antechamber 51 for the combustion of the fuel mixture.

The length of the shroud tube 47 beyond the end of the nozzle unit 33 to the open end 49, that is, the length of the combustion antechamber 51 in respect to its diameter, is sufficient to provide adequate chamber volume for near complete combustion of the fuel prior to its dispersement within the fluidized bed 19 (see FIG. 1). However, an excessively long combustion chamber would permit too large a proportion of heat of combustion to be transferred into the shroud walls. This latter condition could cause overheating with resulting weakening or melting of the shroud. It has been found that combustion chambers with length-to-diameter ratios of about 3:1 perform satisfactorily respecting these criteria and it is reasonable to assume that combustion antechambers having length-to-diameter ratios of 2:1 to 5:1 would be quite suitable for use with the present invention.

The shroud 47 is of larger diametrical dimensions than nozzle unit 33 to provide an annular volume 53 therebetween. It includes an inlet 55 directly communicating with annular volume 53. An oxygen-rich gas, that is air enriched with oxygen or substantially all oxygen, is admitted in inlet 55 from oxygen-rich gas supply 56 to intermix with the fuel-gas mixture discharged from nozzle unit 33. Inlet 55 is arranged radially to the shroud and nozzle unit to enhance mixing within the combustion chamber by preventing the oxygen-rich gas from streaming predominantly along one side of the nozzle unit 33.

The materials employed in constructing the shroud and nozzle assembly are those capable of withstanding the elevated temperatures and corrosive environment of the calciner process. In the calcination of nuclear waste materials, temperatures of 400°–900° C. can be produced in an acid environment. In such applications, heat-resisting alloys such as austenitic stainless steels, other iron-base alloys with high chromium and high nickel content, and nickel-base alloys can be employed. As an example, Incoloy 825 with a nominal composition of about 43% Ni, 30% Fe, 21% Cr and minor amounts of C, Mn, S, Si, Cu, Al, Ti and Mo was found to be quite suitable as a shroud material.

In arranging the nozzle and shroud burner assembly 27 within the walls of vessel 11, it is preferable that the nozzle unit terminate and the combustion chamber begin at a location about flush with the walls of the calciner vessel 11. This permits combustion to take place within the shroud combustion chamber in close communication with the fluidized bed, but yet without exposing an unnecessary length of the shroud to the bed erosion and high-temperature combustion gases. Some latitude in this arrangement is permissible as is indicated in FIG. 2 where the combustion chamber is shown to begin at the internal surface of vessel 11. On installation, flange 31 can be closely coupled against or recessed into the wall of vessel 11. As an alternative, nozzle unit 33 can be positioned with its discharge end somewhat recessed within the vessel 11 walls, but no more than about flush with the external surface of the vessel.

In the operation of the fluidized bed calciner, vessel 11 is charged with a particulate refractory material such as alumina or another material that has been calcined previously. Air is passed upwardly through inlet 13 by the blower 21 to fluidize the bed of particulate material 19. Initially the air can be heated by an auxiliary heating means (not shown) to a sufficient temperature, e.g. 300°–400° C. to ignite the fuel mixture entering through the nozzle shroud assembly 27. The fluidizing air flow is maintained at a suitable velocity of about 0.2 to 0.5 meters per second to fluidize the particulate material within bed 19. As the feed liquid enters through inlet 24, newly formed calcined material coats the existing particles within bed 19 as well as forming new particles of, for instance, alumina and other oxides. The calcined product thus formed is removed through outlet 25 to maintain the desired mass of material within the fluidized bed.

In operating the nozzle and shroud burner assembly 27, it is often desirable to enrich air flow with additional oxygen. The combustion efficiency is increased by oxygen addition in both prior art devices and the improved burner assembly of the present invention. In the present application, it is preferable that the oxygen enrichment be added as shroud gas entering at 55 and that only ordinary air be introduced at inlet 45 to the venturi orifices 39. It has been found that this arrangement can give a near complete combustion of the fuel while reducing high-temperature damage to the assembly and agglomerate formation on the shroud.

In order to demonstrate the operation of the nozzle and shroud burner assembly, a small pilot-plant calciner of about 30 cm diameter was operated with a shroud tube combustion chamber of about 2.5 cm diameter and 7.5 cm length extending beyond the nozzle into the fluidized-bed region. A solution of aluminum nitrate, $Al(NO_3)_3$, was fed into the calciner to form alumina, $Al_2O_3$, as product. Air was introduced through the nozzle unit and substantially only oxygen gas through the shroud. Typical operating conditions for the run are given below in Table I.

TABLE I

| | |
|---|---|
| Bed | Alumina |
| Fuel | Kerosene |
| Bed Temperature | 497 ± 8° C. |
| Fluidizing Velocity | 0.24 m/sec |
| | (below nozzles) |
| Average Feed Rate | 24.1 liters/hr |
| $O_2$/fuel (including air) | 2487 ∓ 6%* |
| (pure $O_2$ only) | 1783 ∓ 6%* |

TABLE I-continued

| Run Time | 100 hrs |
|---|---|

*by volume

During the run average combustion efficiencies of about 99% were obtained as compared with about 94–95% in runs without shrouded nozzles but with about the same amount of pure oxygen addition. (Combustion efficiency relates to fuel burned in respect to fuel available and can be determined by monitoring off-gases.) It was also found that the amount of fines produced per unit of product was about four times smaller than for calcination runs with nozzles having no shrouds, thus indicating less particle attrition.

It will therefore be seen from the above that the present invention provides a fluidized-bed calciner with an improved burner assembly having a tubular shroud positioned around a fuel nozzle unit. The improvement provides good combustion efficiency while supplying a substantial portion of the required oxygen from air. This is accomplished by providing a combustion antechamber with means for adding only oxygen or an enriched oxygen-air stream downstream from the fuel nozzle unit in which the liquid fuel is atomized into an air flow. The shroud protects the fuel nozzle from erosion by the fluidized-bed particles and minimizes attrition of particles within the bed from the high-temperature, high-velocity combustion gases. In addition, melting of bed particles and clinker formation is minimized by protecting the bed material from the extremely high temperatures.

The embodiments of the invention in which an exclusive property or privilege is claimed are defined as follows:

1. In a fluidized-bed calciner for the processing of liquids containing solidifiable material to form dry solid particles, wherein said calciner comprises a vessel having walls defining an internal chamber, fluidizable solid particles within said chamber, means for passing an upward gas flow through said vessel to fluidize said solid particles, and nozzle means for injecting a fuel mixture for combustion into said internal chamber of said vessel, said nozzle means includes a first conduit for passing liquid fuel terminating with a venturi section towards said internal chamber of said vessel, said venturi section having a generally central constricted portion, a second conduit generally coaxially disposed about said first conduit to define an annulus for passing an oxygen-containing gas, said second conduit terminating around said venturi section and said venturi section including radial passageways at the constricted portion thereof whereby oxygen-containing gas from said second conduit is caused to flow into and atomize said liquid fuel, the improvement comprising an elongated, tubular shroud with one open end, disposed generally coaxially about said nozzle means, said nozzle means terminating at a location about flush with said vessel walls and said tubular shroud extending beyond the end of said nozzle means at said open end into said internal chamber to provide an antechamber within said shroud end portion between said open end and said nozzle means for the combustion of said fuel, said antechamber having a length-to-diameter ratio of about 2:1 to 5:1 extending into said internal chamber and supply means communicating with said shroud for supplying an oxygen-rich gas with a higher oxygen concentration than air to said antechamber.

2. The fluidized-bed calciner of claim 1 wherein said shroud coaxially extends over and beyond the length of said nozzle means to define an annular volume therebetween and said combustion antechamber beyond said nozzle means, said shroud including inlet means for admitting a flow of said oxygen-rich gas at a location in direct communication with said annular volume around said nozzle means.

3. The fluidized-bed calciner of claim 2 wherein said inlet means is radially aligned with said shroud, annular volume and nozzle means.

4. The fluidized-bed calciner of claim 1 wherein said vessel includes an inlet towards the central portion thereof for introducing a liquid containing solidifiable material and an outlet towards the lower portion thereof for withdrawing said dry solid particles.

* * * * *